Oct. 14, 1958   H. D. WITZEL   2,856,216
JOINT
Filed Nov. 8, 1954
FIG. 1
FIG. 2
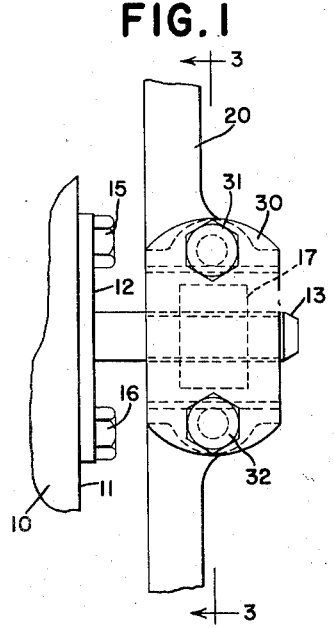
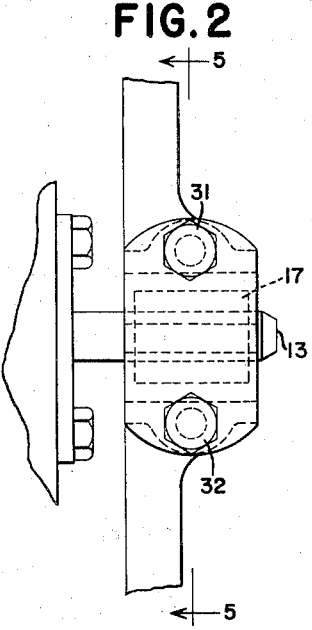
FIG. 3   FIG. 4   FIG. 5
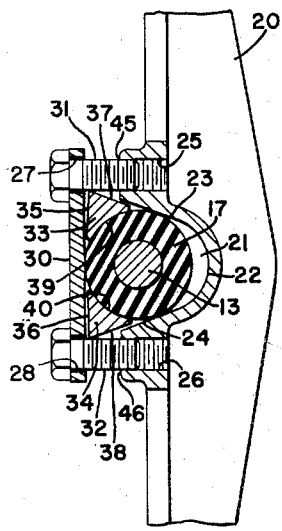
INVENTOR.
H. D. WITZEL United States Patent Office 2,856,216
Patented Oct. 14, 1958

2,856,216
JOINT

Homer D. Witzel, Bettendorf, Iowa, assignor, by mesne assignments, to Deere & Company, a corporation of Delaware Application November 8, 1954, Serial No. 467,367

11 Claims. (Cl. 287—85)

This invention relates to a flexible joint of the type having a rigid elongated inner core and an outer cylindrical member concentric with the core with a bushing of rubber or like material, compressed between the core and the cylindrical member. The purpose of such a flexible joint is to provide a limited amount of axial and angular movement of the core relative to the cylindrical member.

A flexible joint of this type has heretofore been assembled mainly by utilizing a rubber bushing having an outer diameter in its free state substantially larger than the diameter of the cylindrical member and forcing it axially between the inner core and the cylindrical member. This causes the bushing to compress radially and to elongate axially and has the effect of providing high unit radial pressure between the rubber bushing, the core, and the outer surface which causes a frictional resistance to axial or angular movement between the surfaces of the rubber bushing, the core, and the outer cylinder. Such a method of assembly, however, normally requires special tools and equipment which are available only in the factory or a special work shop equipped especially to handle them.

Also included as a common method of assembly of a flexible joint is a process in which the rubber bushing is caused to adhere to the metallic core and outer cylindrical surface by means of a vulcanization process. However, this process of assembly is, for the most part, even more complicated than the previous and is also dependent upon special equipment that is available only in the factory of manufacture.

In many instances the inner core is in a fixed relation to an implement or piece of equipment that would, upon replacement of the bushing, or due to space limitation, cause considerable effort to replace as an entire assembly. There therefore exists a considerable need of a bushing assembly that can be assembled without use of special equipment and at the place where the implement or piece of equipment is.

It is the primary object of this invention to provide a rubber bushing type of flexible joint that can be readily assembled or disassembled without the use of special equipment and with a very small amount of effort.

It is also an object of this invention to provide a flexible joint of the type described in which the rubber bushing may be replaced without injuring or destroying the other parts of the assembly. In this manner the core and outer cylinder may be retained while the relatively low cost rubber bushing may be replaced. Therefore, as the bushing becomes worn, replacement may be made with a minimum of cost.

It is also an object of this invention to provide a flexible joint of the type described in which the unit radial pressure between the rubber bushing, inner core, and the outer cylindrical surface may be regulated to conform to the demands of the load on the bushings.

These and other objects of the invention will become apparent to one skilled in the art upon consideration of the accompanying drawings and the description which follows.

Fig. 1 is a plan view of the flexible joint. The rubber bushing, as shown in dotted representation, is in its non-compressed condition.

Fig. 2 is a view similar to Fig. 1. The rubber bushing, also shown in dotted representation, is in a compressed condition.

Fig. 3 is a sectional view taken along the lines 3—3 of Fig. 1.

Fig. 4 is a view similar to Fig. 3 with the rubber bushing shown in semi-compressed condition.

Fig. 5 is a sectional view taken along the line 5—5 of Fig. 3.

Referring now to the drawings, reference numeral 13 represents a laterally projecting rigid elongated core mounted on a framework or structural support 10. The core 13 is held in fixed relationship to the framework 10 by means of a flange or plate member 12 integral with the core that has a surface adjacent to a vertically disposed surface 11 on the framework 10 and is held in position by two spaced apart bolts 15 and 16. An annular bushing 17 of elastic material, preferably of rubber, surrounds the core and is concentric therewith.

A load supporting housing member 20 has a U-shaped notch 21 for receiving the bushing and core. The U-shaped notch 21 is made up of an approximately semi-cylindrical surface 22 that is proximate to and positioned to receive a portion of the bushing 17, and a pair of plane surfaces 23 and 24 projecting from respective opposite ends of the semicylindrical surface 22 and in diverging relationship to each other. Completing the bushing housing is a plate member 30 which is associated with the U-shaped notch 21 for containing the bushing 17 and core 13 therebetween. On opposite sides of the U-shaped notch are tapped bores 25, 26 which receive threaded bolts 31 and 32 respectively. The bolts 31, 32 pass through suitable apertures 27, 28 in the plate member 30 and serve as adjustable connecting means for mounting the plate member 30 on the housing member 20.

A pair of elongated wedge elements 33 and 34 are also contained between the plate member 30 and the plate housing member 20. The wedge element 33 has a plane surface 37 that is slidably engageable with the diverging plane surface 23, a surface 35 that is slidably engageable with the plate member 30, and a partial cylindrical surface 39 adjacent the outer perimeter of the bushing 17. The wedge element 34 has a surface 38 slidably engageable with the diverging plane surface 24, a surface 36 slidably engageable with the plate member 30, and a partial cylindrical surface 40 adjacent to the outer perimeter of the bushing 17.

The bushing assembly is adjusted in a manner shown in Figs. 3, 4 and 5. The bolts 31 and 32 may be sufficiently loosened or completely removed to permit the rubber bushing 17 to slide, while in a free state, axially along the elongated core 13. By adjusting the bolts 31 and 32 to draw the plate member 30 towards the housing member 20 the wedge elements 33 and 34 will slide along the respective plane surfaces 23 and 24 of the housing member 20 and the inner plane surface of the plate member 30. As is apparent from the drawings, the angular relationships between the diverging plane surfaces 23, 24 and the plate 30 are such as to cause the wedge elements to move radially with the result that the cylindrical surfaces 39 and 40 of the respective wedge elements 33 and 34 converge toward the core 13. In the initial stages of the radial movement of the wedge elements 33 and 34 the bushing 17 will seat itself into the semicylindrical surface 22 of the housing member 20. After the initial stage further radial movement of the elements will result in substantially equal unit pressure between the core, the bushing, and all of the outer cylindrical surfaces. Pressure applied by the plate 30 and transmitted through the wedge elements 33 and 34 will cause the bushing 17 to elongate axially from its free state shown in Fig. 1 to its maximum axial elongation shown in Fig. 2. A corresponding reduction in the radial dimension of the bushing will result as shown also in Figs. 3, 4, and 5.

Depending upon the amount of the load carried and the physical conditions under which it is carried, the shock-absorbing effect or the unit pressure of the bushing assembly may be regulated by adjusting the distance between the plate member 30 and the housing member 20.

Referring specifically to Fig. 5, the radial movement of the wedge elements 33 and 34 is limited to a position determined when the plate member 30 contacts abutments 45 and 46 on the housing member 20. In this manner the abutments 45 and 46 serve as stop means cooperating with the adjusting means or bolts 31 and 32 to limit the inward radial movement of the wedge elements.

It should here be noted that the semicylindrical surface 22 of the housing 20 and the cylindrical surfaces 39 and 40 on the respective wedge elements 33 and 34 have radii that are substantially less than the radius of the rubber bushing 17 in its free state and that the radii of all the cylindrical surfaces are equal. Again viewing Fig. 5 it becomes apparent that the partial cylindrical surfaces 39 and 40, of the wedge elements, since each has an approximate angular displacement substantially 90°, operate together to form a second semicylindrical surface complementary to the semicylindrical surface 22 on the housing 20. In the particular species shown this occurs when the wedge elements have reached their radial innermost positions which occurs when the plate member abuts the abutments 45, 46.

What I claim is:

1. An adjustable flexible joint comprising a rigid elongated core; an annular bushing of elastic material surrounding the core and concentric therewith; a housing member having an arcuate surface proximate to and for receiving a portion of the bushing and having plane surfaces projecting from opposite ends thereof in diverging relation to one another; a pair of adjustable elements, each having an arcuate surface adjacent to the bushing, and a plane surface in sliding engagement with a respective plane surface of the housing member and in an angular relation with the arcuate surface of the element whereby relative movement between the elements and the housing member along the plane surfaces will result in substantially radial movement of the arcuate surfaces relative to the core; a plate member adjacent to the elements and in opposed relation to the housing member for containing the elements and core therebetween; and connecting means between the plate member and the housing member, said means being adjustable to vary the radial positions between the arcuate surfaces and the core.

2. An adjustable flexible joint comprising a rigid elongated core; an annular bushing of elastic material surrounding the core and concentric therewith; a housing including a housing member having an arcuate surface proximate to and for receiving a portion of the bushing and having plane surfaces projecting from opposite ends thereof in diverging relation to one another; a pair of adjustable elements, each having an arcuate surface adjacent to the bushing, and a plane surface in sliding engagement with a respective plane surface of the housing member and in an angular relation with the arcuate surface of the element whereby relative movement between the elements and the housing member along the plane surfaces will result in substantially radial movement of the arcuate surfaces relative to the core; and means on the housing for moving the elements to adjust the arcuate surfaces radially relative to the core.

3. The invention defined in claim 2, further characterized by stop means associated with the said means on the housing for limiting inward radial movement of the arcuate surfaces relative to the core.

4. The invention defined in claim 3, further characterized by the arcuate surfaces of the wedge elements and the housing member forming substantially a cylindrical surface concentric with the core as the elements and housing member approach their innermost radial positions.

5. An adjustable flexible joint comprising a rigid elongated core; an annular bushing of elastic material surrounding the core and concentric therewith; a housing comprising a first member having a partial cylindrical surface proximate to the outer periphery of the bushing and for receiving a portion of the bushing and a pair of plane surfaces projecting from respective opposite ends of the cylindrical surface and in diverging relation to one another, and a plate member in opposed relation to the first member for containing the bushing and core therebetween; a pair of wedge elements, each having a partial cylindrical surface adjacent to the outer periphery of the bushing, a plane surface in sliding engagement with a respective diverging plane surface on the first member, and a plane surface in sliding engagement with the plate member; and connecting means between the plate member and the first member including adjustable means for moving the plate member relative to the first member for causing relative radial movement between the cylindrical surfaces and the core.

6. The invention defined in claim 5, further characterized by the cylindrical surfaces of the first member and the wedge elements having equal radii with the radii being substantially less than the radius of the bushing in its free state.

7. The invention defined in claim 6, further characterized by the angular sum of the partial cylindrical surfaces of the wedge elements and the first member being substantially 360°.

8. The invention defined in claim 6, further characterized by the partial cylindrical surface of the first member being semicylindrical and the cylindrical surfaces of each of the wedge elements being approximately quarter-cylindrical.

9. The invention defined in claim 7, further characterized by stop means on the housing limiting inward radial movement of the cylindrical surfaces to their radii.

10. An adjustable flexible joint comprising a rigid elongated core; an annular bushing of elastic material surrounding the core and concentric therewith; a housing comprising a first member having a surface adjacent to the outer periphery of the bushing and a pair of plane surfaces projecting from respective opposite ends of the aforesaid surface and in diverging relation to one another, and a plate member in opposed relation to the first member for containing the bushing and core therebetween; a pair of wedge elements, each having a surface adjacent to the outer periphery of the bushing, a plane surface in sliding engagement with a respective diverging plane surface on the first member, and a plane surface in sliding engagement with the plate member; and connecting means between the plate member and the first member, including adjustable means between the plate member and the first member for adjusting the radial position of the elements relative to the core.

11. A flexible joint having a rigid elongated core surrounded by a bushing of elastic material; an outer housing; radially adjustable elements having surfaces adjacent to and circumferentially spaced around the bushing; and means on the housing adjustable to move the elements radially relative to the core whereby the radial pressure on the bushing by the surfaces may be regulated.

References Cited in the file of this patent

UNITED STATES PATENTS

| 2,068,474 | Schwinn | Jan. 19, 1937 |
| 2,097,470 | Richardson | Nov. 2, 1937 |
| 2,674,772 | Jacobs | Apr. 13, 1954 |